US009817241B2

(12) United States Patent
Lee

(10) Patent No.: US 9,817,241 B2
(45) Date of Patent: Nov. 14, 2017

(54) PARALLEL PLATE AND TWIN POLARIZATION WAVELENGTH ISOLATION FILTERS FOR OPTICAL COMMUNICATIONS

(71) Applicant: Keysight Technologies, Inc., Minneapolis, MN (US)

(72) Inventor: Hakchu Lee, San Jose, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 156 days.

(21) Appl. No.: 14/658,225

(22) Filed: Mar. 15, 2015

(65) Prior Publication Data

US 2015/0331244 A1 Nov. 19, 2015

Related U.S. Application Data

(60) Provisional application No. 61/993,575, filed on May 15, 2014.

(51) Int. Cl.

| | |
|---|---|
| ***G02B 27/10*** | (2006.01) |
| ***G02B 27/28*** | (2006.01) |
| ***G02B 5/30*** | (2006.01) |
| ***G02B 1/11*** | (2015.01) |
| ***G02B 5/28*** | (2006.01) |
| ***G02B 27/14*** | (2006.01) |

(52) U.S. Cl.

CPC .............. *G02B 27/285* (2013.01); *G02B 1/11* (2013.01); *G02B 5/288* (2013.01); *G02B 5/3083* (2013.01); *G02B 27/1006* (2013.01); *G02B 27/141* (2013.01); *G02B 27/283* (2013.01); *G02B 5/28* (2013.01)

(58) Field of Classification Search

CPC ........ G02B 27/285; G02B 1/11; G02B 5/288; G02B 5/3083; G02B 27/1006; G02B 27/141; G02B 27/283

USPC .......................................................... 359/489

See application file for complete search history.

(56) References Cited

U.S. PATENT DOCUMENTS 4,373,782 A * 2/1983 Thelen ............... H04B 10/2504 359/583
2009/0244448 A1* 10/2009 Chang .............. G02F 1/133514 349/106
2010/0165551 A1* 7/2010 Chen ..................... G02B 1/005 361/679.01
2012/0293868 A1* 11/2012 Wang ..................... G02B 5/285 359/485.03
2013/0308198 A1* 11/2013 Erdogan ............. G02B 27/126 359/640

* cited by examiner

*Primary Examiner* — Bumsuk Won
*Assistant Examiner* — Grant Gagnon

(57) ABSTRACT

Optical filter assemblies based on either a parallel plate optical assembly or a polarization separation optical assembly are described. The optical assemblies usefully separate randomly polarized light with at least two transmission wavelengths from an optical communication signal.

13 Claims, 7 Drawing Sheets

100
110 λ1 λ2 112
LWP SWP
111 109
103 102
101 AIR 108 105 114
113 104
θ
106
AR
107

PARALLEL PLATE AND TWIN POLARIZATION WAVELENGTH ISOLATION FILTERS FOR OPTICAL COMMUNICATIONS

CROSS-REFERENCE TO RELATED APPLICATIONS

The present application claims priority under 35 U.S.C. §119(e) from commonly owned U.S. Provisional Application No. 61/993,575 filed on May 15, 2014 to Lee, et al. The entire disclosure of U.S. Provisional Application No. 61/993,575 is specifically incorporated herein by reference.

BACKGROUND

Optical communications are a ubiquitous form of transmission and reception of signals. In some applications, it is useful to sample the optical signals transmitted in free space optical communication network. One known filter is a monolithic rhomboid filter that may be used to isolate signals having two randomly polarized wavelengths. The rhomb consists of an immersed Long Wave Pass (LWP) filter coating. This known filter is often used to separate component wavelengths of the signal based on wavelength. While certain advancements have been made with the use of the referenced known filter, there are significant shortcomings that are attached with its use. First, the known filter is a monolithic structure, which makes equal intensity separation of polarization states difficult. As such, it is difficult, using the non-polarizing filter (NPF) implemented in the known monolithic rhomboid filter to reflect both polarization states of a first wavelength component of the optical signal and to transmit both polarization states of a second wavelength of the optical signal. Second, the long wavelength pass (LWP) filter implemented in the known filter is comparatively complex, rather thick, and is comprised of a rather large number of thin film layers used for interferometric wavelength separation, and improving the degree of polarization separation. In addition to increased complexity of manufacture of the filter as a result, the contrast ratio (($T_{s1}/T_{s2}$) and ($T_{p1}/T_{p2}$)) for wavelengths 1 and 2 is reduced (where $T_{s1}$ is S transmittance of highly transmitting wavelength and $T_{s2}$ is S transmittance of highly reflecting wavelength). As can be appreciated by one of ordinary skill in the art, this loss in intensity can reduce the accuracy of any measurements made on the sampled signal. The representative embodiments are best understood from the following detailed description when read with the accompanying drawing figures. Wherever applicable and practical, like reference numerals refer to like elements. What is needed, therefore, is a filter for sampling optical signals that overcomes at least the drawbacks of the known filter described above.

DETAILED DESCRIPTION

Figure 1:
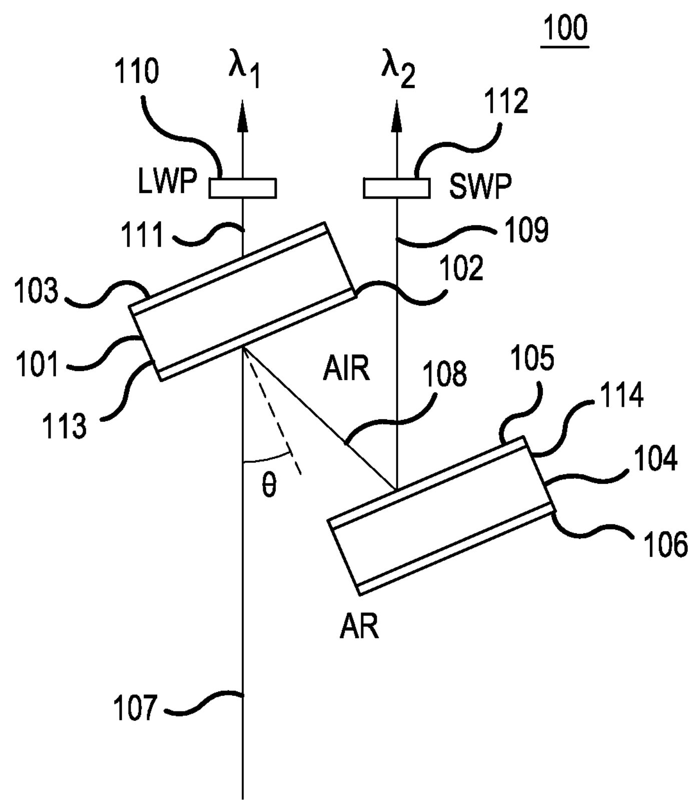
FIG. 1 is a perspective view of an optical filter assembly according to a representative embodiment.

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

As used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable.

As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Generally, it is understood that the drawings and the various elements depicted therein are not drawn to scale. Further, relative terms, such as "above," "below," "top," "bottom," "upper" and "lower" are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be below that element.

Generally, the present teaching relates to optical filter assemblies usefully in a variety of applications, such as sampling optical communication signals.

In accordance with a representative embodiment, an optical assembly comprises a first optical assembly comprising a first face and a second face. The first face has a first non-polarizing edge filter (NPEF) disposed thereover, and the second face has a first anti-reflection (AR) coating disposed thereover. The optical filter assembly also comprises a second optical assembly offset from the first optical assembly. The second optical assembly comprises a third face and a fourth face. The third face has a second NPEF disposed thereover and a second AR coating disposed thereover. Illustratively, an incident optical beam is incident on the first face of the first optical assembly at an angle relative to a normal to the surface of the first face sufficient to separate polarization states of the incident optical beam but not too great that physical separation of wavelengths of the light is insufficient, and a reflected optical beam is reflected from the first face is incident on the third face at an angle relative to a normal to the surface of the third face sufficient to separate polarization states of the incident optical beam but not too great that physical separation of wavelengths of the light is insufficient. Generally, the angle relative to a normal to the surface of the first face and to the second face is selected to be to separate polarization states of the incident optical beam but not too small that physical separation of wavelengths of the light is insufficient. In a representative embodiment, the angle is approximately 17° to approximately 30°. An angle of 22.5° is found to be a useful angle.

In accordance with another representative embodiment, an optical filter assembly comprises a first optical component adapted to receive an input optical beam. The input optical beam comprises light having a first wavelength and a second wavelength, and the first wavelength is greater than the second wavelength. A first polarization beam splitter (PBS) is disposed in the first optical component. The first PBS is configured to transmit substantially all of the light of the first and second wavelengths having a first state (P) of polarization, and to reflect substantially all of the light of the first and second wavelengths having a second state (S) of polarization. The optical filter assembly also comprises a half-wave optical phase retarder disposed over a surface of the first optical component. The transmitted light of the first and second wavelengths have a first state of polarization that is incident on the first half-wave plate and emerges from the first half-wave plate having the second state of polarization. The optical filter assembly also comprises a second optical component adapted to receive the light of the first and second wavelengths that have the second state of polarization reflected by the first PBS. The second optical component comprises a first long-wavelength pass (LWP) optical filter that transmits the light of the first wavelength having the second state of polarization reflected from the first PBS, and that reflects the light of the second wavelength having the second state of polarization reflected from the first PBS. The optical filter assembly also comprises a third optical component adapted to receive the light of the first and second wavelength and having the second state (after emerging from the half-wave plate) of polarization transmitted by the first PBS. The third optical component comprises a second LWP optical filter. The second LWP transmits the light of the first wavelength having the second state of polarization transmitted by the first PBS, and that reflects the light of the second wavelength having the second state of polarization transmitted by the first PBS. The light that is reflected by the second LWP is incident on a second half-wave plate and emerges from the half-wave plate having the first state of polarization and is transmitted to the second optical component and transmitted by the first LWP. The optical filter assembly also comprises a second PBS disposed in the second optical component. The light of the first wavelength having the second state of polarization that is transmitted by the first PBS is incident on a second half-wave plate and emerges from the half-wave plate having the first state of polarization and is transmitted by the second PBS, and the light of the first wavelength having the-second state of polarization that is transmitted by the first LWP is reflected by the second PBS.

FIG. 1 is a perspective view of an optical filter assembly 100 according to a representative embodiment. The optical filter assembly 100 comprises a first optical assembly 101, which comprises a first non-polarizing edge filter (NPEF) 102 disposed over a first face and a first anti-reflection (AR) coating 103 disposed over a second face. The optical filter assembly 100 also comprises a second optical assembly 104 disposed offset from and parallel to the first optical filter assembly 101. The second optical assembly 104 comprises a second NPEF 105 disposed over a third face, and a second AR coating disposed over a fourth face. Notably, the first and third faces, and therefore the first and second NPEF 102, 105, are disposed in parallel planes, and as such the first and second optical assemblies are, therefore, parallel to one another. Moreover, in the presently described embodiment, a comparatively low index of refraction material (e.g., air) is provided in the region between the first and second optical assemblies.

An input optical beam 107 is incident on the first face and thus the first NPEF 102 at an angle θ relative to the normal to the first face. The input optical beam 107 comprises randomly polarized light that includes an optical signal having a first wavelength ($\lambda_1$), an optical signal having a second wavelength ($\lambda_2$), and a tracer beam having a wavelength that is less than either of the first and second wavelengths. In a representative embodiment, the first wavelength is greater than the second wavelength, and the first and second wavelengths are commonly used wavelengths in optical communications. Illustratively, the first wavelength is 1565 nm, the second wavelength is 1550 nm, and the tracer wavelength is 980 nm.

The first NPEF 102 transmits light of the first wavelength ($\lambda_1$) including both states of linear polarization (i.e., S and P polarization), and reflects light of the second wavelength ($\lambda_2$), again including both states of linear polarization. As such, the first NPEF 102 provides wavelength filtering but not polarization separation. Because of the geometrical arrangement of the first and second optical assemblies 101, 104, a light beam 108 is reflected from the first NPEF 102 and is incident on the second NPEF 105 at the same angle θ relative to the normal to the third face, and thus the second NPEF 105. The light beam 807, which comprises the shorter second wavelength light is reflected from the second NPEF 105 and emerges as a first output optical beam 109 from the optical filter assembly 100. Similarly, the portion of the input optical beam 107 that is transmitted by the first NPEF 102 is transmitted through the first optical assembly 101 and emerges as the second output optical beam 110 from the optical filter assembly. As such, the optical filter assembly 100 physically separates the light of the first wavelength from the input optical beam 107 and provides this as the second output optical beam 110, and physically separates light of the second wavelength from the input optical beam and provides this as the first output optical beam 109. The tracer beam (not shown) can be separated from the input optical beam 107 and provided as a third output beam. Finally, the second output optical beam 110 is further filtered by a long wavelength pass (LWP) filter 111 and the first output optical beam 109 is further filtered by a short wavelength pass (SWP) filter 112 to provide further rejection of short and long wavelength elements in the second and first output optical beams 110, 109, respectively.

In a representative embodiment, the first optical assembly 101 comprises a first layer 113 disposed between the first NPEF 102 and the first AR coating 103, and the second optical assembly 104 comprises a second layer 114 disposed between the second NPEF 105 and the second AR coating 106. The first and second layers 113, 114 are illustratively optical-grade glass (e.g., borosilicate glass (BSG), or fused silica (FS), or SF-10), or similar material and have a thickness selected to provide suitable spacing between the respective NPEFs and AR coatings. As noted above, a low index of refraction material (e.g., air) is provided between the first and second optical assemblies. Due to the difference in the indices of refraction of the first and second layers 113, 114 and the low index of refraction material between the first and second optical assemblies 101, 104, wavelength separation without separation of light by linear polarization states is beneficially improved.

As noted above, the first layer 113 has a first face over which the first NPEF 102 is disposed, and a second face over which the first AR coating 103 is disposed. Likewise, the second layer 114 has a third face over which the second NPEF 105 is disposed, and a second face over which the second AR coating 106 is disposed. The first through fourth faces are suitably polished to reduce, to the extent practical, spaces or voids between the respective layers (i.e., NPEFs, AR coatings) disposed thereover, to ensure suitable wavelength discrimination at each optical interface.

The first and second NPEFs 102, 105 and the AR coatings are illustratively thin film interferometers comprising a plurality of layers having selected indices of refraction and thicknesses to achieve transmission and reflection of light by wavelength. Moreover, the number of layers is also selected to ensure the desired degree of separation of wavelengths by transmission/reflection.

As noted above, the input optical beam 107 is incident on the first NPEF 102 at an angle θ relative to the normal. Notably, as angle of incidence θ increases at the first NPEF 10F, the transmission curves for the two linear polarization states (S- and P-polarization) diverges in wavelength space. This happens because the admittance of the first NPEF 102, Y(λ) for S-polarized light and P-polarized light are given by, $$Y(\lambda)_p=N/\cos\theta$$

$$Y(\lambda)_s=N^*\cos\theta$$

where N is refractive index of the material (e.g., first NPEF 102). At normal incidence $Y_p$ and $Y_s$ are equivalent but as λ increases the values diverge. This divergence of admittance as function of wavelength λ and angle of incidence is the fundamental reason for polarization separation at optical interfaces. This effect exists for bare uncoated surfaces as well as all types of coatings such as Long Wave Pass (LWP) filters. Finally, transmission (or reflection) from coatings are functions of the admittance. At incident angle of 22.5° the admittance differences between S and P are less than that at 45°. So from this standpoint it is advantageous to reduce the incident angle to isolate two closely spaced wavelengths. Generally, the angle θ relative to a normal to the surface of the first NPEF 102 is sufficient to separate polarization states of the incident optical beam but not too great that physical separation of wavelengths of the light is insufficient. In a representative embodiment, the angle θ is approximately 17° to approximately 30°. An angle θ of 22.5° is found to be a useful angle. The optical beam 108 is reflected and is incident on the surface of the third NPEF 105 at the angle θ relative to a normal to the surface of the third NPEF 105. Again, the angle θ is sufficient to separate polarization states of the incident optical beam but not too small that physical separation of wavelengths of the light is insufficient. In a representative embodiment, the angle θ is approximately 17° to approximately 30°. An angle θ of 22.5° is found to be a useful angle.

Figure 2:
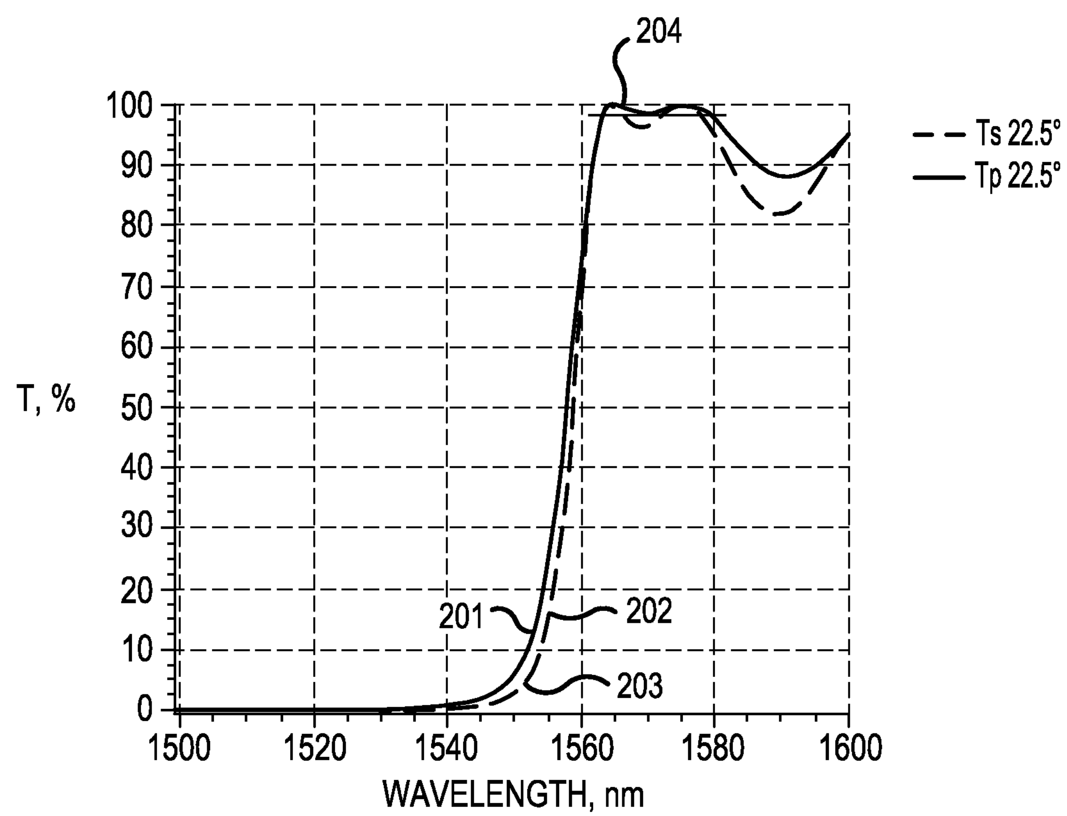
FIG. 2 is a graph of transmittance (%) versus wavelength of an optical filter for two linear polarization states according to a representative embodiment.

FIG. 2 is a graph of transmittance (%) versus wavelength of an optical filter for two linear polarization states according to a representative embodiment. Illustratively, the optical filter may be the first NPEF 102 or the second NPEF 105 depicted in FIG. 1. Moreover, the transmittance versus wavelength depicted in FIG. 2 is for light incident at an angle of 22.5° relative to the normal to the surface of the optical filter. Curve 201 depicts the transmittance of P-polarized light, and curve 202 depicts the transmittance of S-polarized light. As can be seen in FIG. 2, at a shorter wavelength, such as 1550 nm in region 203 of the graph, the transmittance of both states of linearly polarized light is comparatively very low, being on the order of approximately 5%. By contrast, at a longer wavelength, such as 1565 nm in region 204, the transmittance of both states of linearly polarized light is comparatively very high, being on the order of 99%. As such, use of an optical filter with these characteristics for first and second NPEFs 102, 105 usefully passes light of both states of linear polarization at higher wavelengths (e.g., $\lambda_1$) and blocks the transmission of light of both states of linear polarization at lower wavelengths (e.g., $\lambda_2$), which is then reflected as described above.

Figure 3:
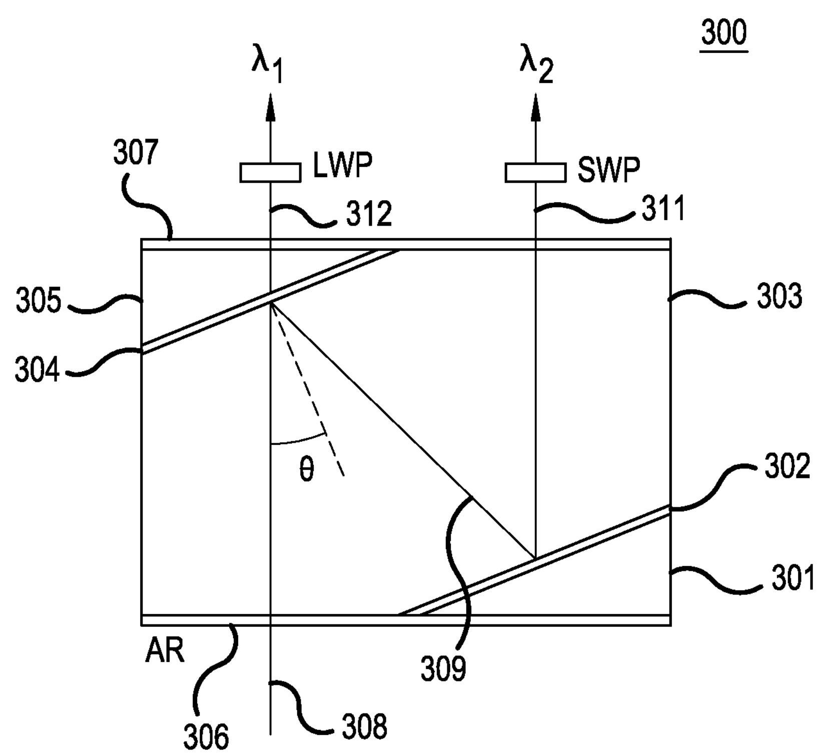
FIG. 3 is a cross-sectional view of an optical filter assembly according to a representative embodiment.

FIG. 3 is a cross-sectional view of an optical filter assembly 300 according to a representative embodiment. Many aspects of the optical filter assembly 100 described above are directly applicable to the optical filter assembly 300, and often are not repeated in order to avoid obscuring the presently described embodiments.

Optical filter assembly 300 comprises a first layer 301, with a first NPEF 302 disposed thereover. A second layer 303 is disposed over the first NPEF 302, and has a second NPEF 304 disposed thereover. A third layer 305 is disposed over the second NPEF 304. A first AR coating 306 is disposed over portions of the first NPEF 302 and the second layer 303. Similarly, a second AR coating 307 is disposed over portions of third layer 305 and the second layer 303.

An input optical beam 308 is incident on the first AR coating and traverses the second layer 303, where it is incident on the second NPEF 304 at an angle θ relative to the normal to the second layer. The input optical beam 308 comprises randomly polarized light that includes an optical signal having a first wavelength ($\lambda_1$), an optical signal having a second wavelength ($\lambda_2$), and a tracer beam having a wavelength that is less than either of the first and second wavelengths. In a representative embodiment, the first wavelength is greater than the second wavelength, and the first and second wavelengths are commonly used wavelengths in optical communications. Illustratively, the first wavelength is 1565 nm, the second wavelength is 1550 nm, and the tracer wavelength is 980 nm.

The second NPEF 304 transmits light of the first wavelength ($\lambda_1$) including both states of linear polarization (i.e., S and P polarization), and reflects light of the second wavelength ($\lambda_2$), again including both states of linear polarization. As such, the second NPEF 304 provides wavelength filtering but not polarization separation. A light beam 309 is reflected from the second NPEF 304, traverses the second layer 303 and, because of the geometrical arrangement of the first, second and third layers 301, 303, 305 is incident on the first NPEF 302 at the same angle θ relative to the normal to the first layer 301. The light beam 309, which comprises the shorter second wavelength light is reflected from the first NPEF 302 and emerges as a first output optical beam 311 from the optical filter assembly 300.

Similarly, the portion of the input optical beam 308 that is transmitted by the second NPEF 304 is transmitted through the third layer 305 and the second AR coating 307 and emerges as the second output optical beam 312 from the optical filter assembly 300. As such, the optical filter assembly 300 physically separates the light of the first wavelength from the input optical beam 308 and provides this as the second output optical beam 312, and physically separates light of the second wavelength from the input optical beam 308 and provides this as the first output optical beam 311. The tracer beam (not shown) can be separated from the input optical beam 308 and provided as a third output beam. Finally, the second output optical beam 312 is further filtered by a long wavelength pass (LWP) filter 313 and the first output optical beam 311 is further filtered by a short wavelength pass (SWP) filter 314 to provide further rejection of short and long wavelength elements in the second and first output optical beams 312, 311, respectively.

Figure 4:
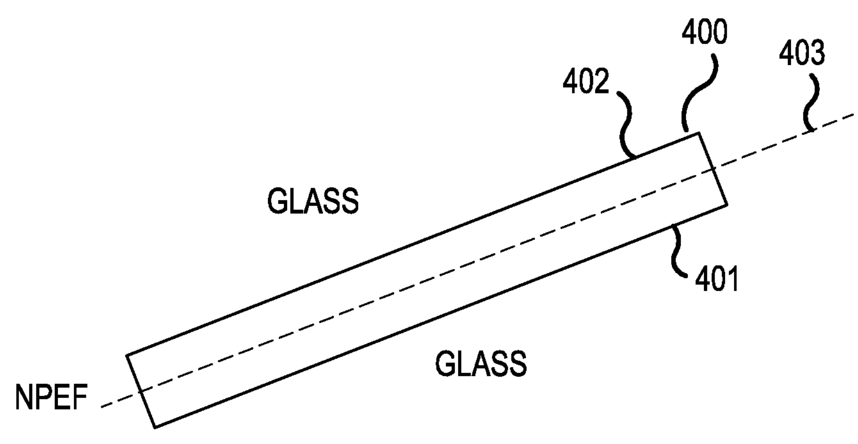
FIG. 4 is a cross-sectional view of an optical filter according to a representative embodiment.

FIG. 4 is a cross-sectional view of an optical filter 400 according to a representative embodiment. In a representative embodiment, the optical filter 400 is first NPEF 302 or second NPEF 304 described above in connection with optical filter assembly 300.

The optical filter 400 is "immersed" in glass, meaning there is glass disposed on both sides 401, 402 of the optical filter 400 are in contact with glass or other material having an index of refraction useful in optical filter assembly 300 described above. Due to the immersion of the optical filter 400, the coating layers comprising the optical filter may be designed to have a line of symmetry 403 at its center as depicted in FIG. 4 as a dotted line. Such coating design may be manufactured by joining two half coatings at the line of symmetry 403. Necessarily, the bonding interface of the two half coatings must have optically insignificant bond thickness and its position within the coating must coincide with the line of symmetry. Although the total thickness of the optical filter 400 (e.g., used as first and second NPEF 302, 304) is greater than is required for the first and second NPEFs 102,105 as implemented in the optical filter assembly 100 described above, the existence of optical symmetry allows the deposition of only half the total thickness. Additionally, low angle of incidence θ further reduces coating complexity and total coating thickness. As a result, it is less costly to manufacture optical filter 400.

Figure 5:
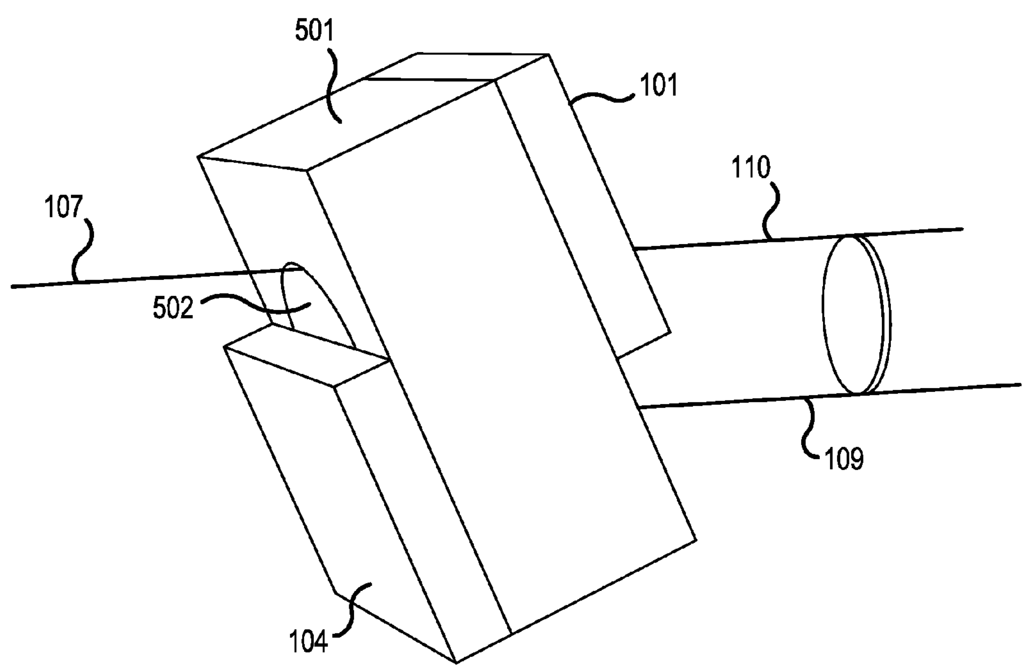
FIG. 5 is a perspective view of an optical filter assembly, according to a representative embodiment.

FIG. 5 is a perspective view of an optical filter assembly 500, according to a representative embodiment. Many aspects of the optical filter assembly 100 described above are directly applicable to the optical filter assembly 500, and often are not repeated in order to avoid obscuring the presently described embodiments.

The optical filter assembly 500 comprises the first optical assembly 101 and the second optical assembly 104 disposed in an offset parallel manner as described above. A spacer 501 is disposed between the first optical assembly 101 and the second optical assembly 104, and comprises an opening 502 that extends completely through the spacer 501. The opening 502 allows input optical beam 107 to be incident on the first face and thus the first NPEF 102 (not shown in FIG. 5) at an angle θ relative to the normal to the first face. As noted above, the input optical beam 107 comprises randomly polarized light that includes an optical signal having a first wavelength ($\lambda_1$), an optical signal having a second wavelength ($\lambda_2$), and a tracer beam having a wavelength that is less than either of the first and second wavelengths. In a representative embodiment, the first wavelength is greater than the second wavelength, and the first and second wavelengths are commonly used wavelengths in optical communications. Illustratively, the first wavelength is 1565 nm, the second wavelength is 1550 nm, and the tracer wavelength is 980 nm.

The first NPEF 102 (not shown in FIG. 5) transmits light of the first wavelength ($\lambda_1$) including both states of linear polarization (i.e., S and P polarization), and reflects light of the second wavelength ($\lambda_2$), again including both states of linear polarization. As such, the first NPEF 102 provides wavelength filtering but not polarization separation. Because of the geometrical arrangement of the first and second optical assemblies 101, 104, the light beam 108 (not shown in FIG. 5) is reflected from the first NPEF 102 (not shown in FIG. 5) and is incident on the second NPEF 105 (not shown in FIG. 5) at the same angle θ relative to the normal to the third face, and thus the second NPEF 105. The light beam 807, which comprises the shorter second wavelength light is reflected from the second NPEF 105 and emerges as the first output optical beam 109 from the optical filter assembly 100. Similarly, the portion of the input optical beam 107 that is transmitted by the first NPEF 102 is transmitted through the first optical assembly 101 and emerges as the second output optical beam 110 from the optical filter assembly 500. As such, the optical filter assembly 500 physically separates the light of the first wavelength from the input optical beam 107 and provides this as the second output optical beam 110, and physically separates light of the second wavelength from the input optical beam and provides this as the first output optical beam 109. The tracer beam (not shown) can be separated from the input optical beam 107 and provided as a third output beam. Finally, the second output optical beam 110 is further filtered by a long wavelength pass (LWP) filter 111 and the first output optical beam 109 is further filtered by a short wavelength pass (SWP) filter 112 to provide further rejection of short and long wavelength elements in the second and first output optical beams 110, 109, respectively.

Figure 6:
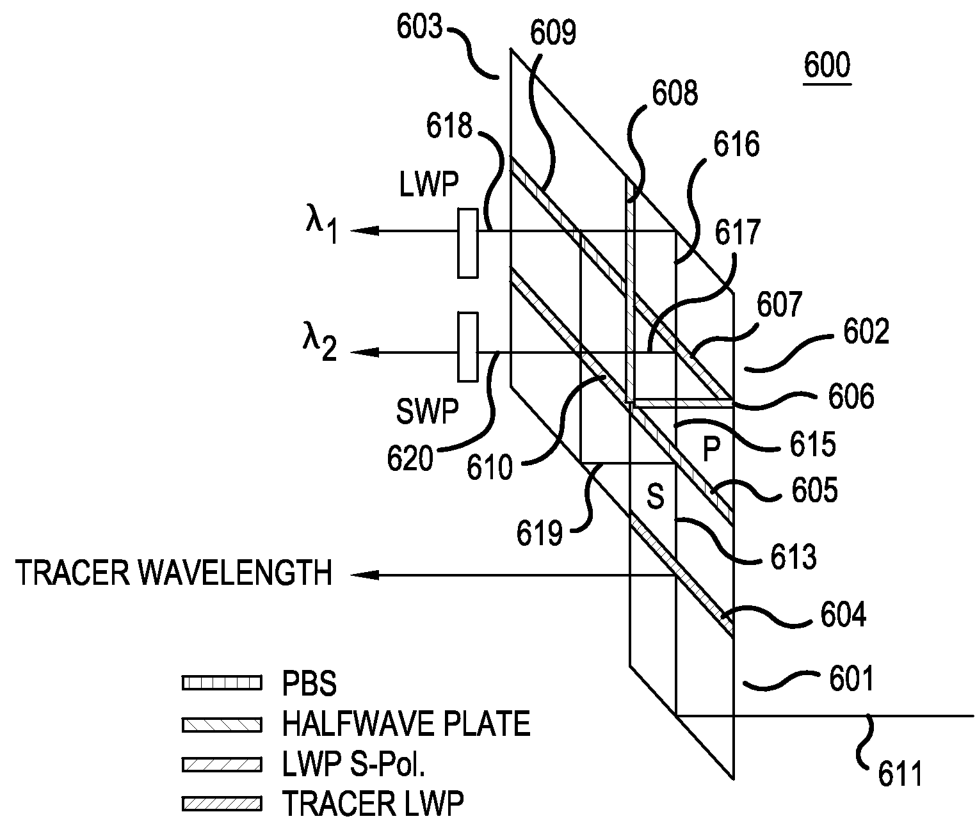
FIG. 6 is a side view of an optical filter assembly, according to a representative embodiment.

FIG. 6 is a side view of an optical filter assembly 600, according to a representative embodiment. Certain aspects of some components of the optical filter assembly 600 are common to certain components of the optical filter assemblies 100, 300, 500 described above, and are often not repeated in order to avoid obscuring the description of the representative embodiments presently described.

The optical filter assembly 600 comprises a first optical component 601, a second optical component 602 and a third optical component 603. The first, second and third optical components 601~603 are illustratively rhomboids made of a suitable material, such as optical grade glass (e.g., borosilicate glass (BSG) or other materials such as listed above).

The first optical component 601 comprises a tracer long wavelength pass (LWP) filter 604 disposed therein. As described in more detail below, the tracer LWP filter 604 passes light of the tracer wavelength of the tracer beam used for alignment of optical devices in the optical communications network (not shown).

The first optical component also comprises a first polarization beam splitter (PBS) 605 disposed therein. As is known, the first PBS 605 usefully transmits light of a first state of linear polarization, and reflects light of a second state of linear polarization. In the representative embodiment, the first PBS 605 transmits P-polarized light and reflects S-polarized light.

The first optical component 601 also comprises a first half-wavelength optical phase retarder 606 disposed over a surface thereof, and in between the first optical component 601 and the second optical component 602. The first half-wavelength optical phase retarder 606 may be one of a number of types of phase-retarders known to one of ordinary skill in the art, such as one of a number of known birefringent crystal materials such as are commercially available from American Polarizers, Inc., Reading, Pa. USA.

The second optical component 602 comprises a first long wavelength pass (LWP) S-polarization filter 607. As described more fully below, the first LWP S-polarization filer 607 will pass light of either S-polarization or P-polarization at the longer first wavelength ($\lambda_1$), but will not pass light of S-polarization at the shorter second wavelength ($\lambda_2$). The first LWPS-polarization filter is highly efficient at separating S-polarized light having first wavelength ($\lambda_1$) and light having second wavelength ($\lambda_2$), which may be comparatively closely spaced wavelengths (e.g., 1550 nm and 1565 nm). However, the total thickness of the first LWP S-polarization filter 607 is approximately 13 μm, which is approximately one-half the thickness of the known non-polarizing edge filter. Additionally, single polarization edge filters are less costly to manufacture due to their lower sensitivity to coating process errors. Beneficially, a comparatively thinner LWP (e.g., first LWP S-Polarization filter 607) has lower mechanical stress and sensitivity to coating process errors that can occur during deposition.

A second half-wavelength phase retarder 608 is disposed over a surface of the second optical component 602 and between the second optical component 602 and the third optical component 603. The second half-wavelength optical phase retarder 608 may be one of a number of types of phase-retarders known to one of ordinary skill in the art, such as one of a number of known birefringent crystal materials such as are commercially available from American Polarizers, Inc., Reading, Pa. USA.

The third optical component 603 comprises a second PBS 609 disposed therein. The second PBS 609 is substantially the same as the first PBS 605, and usefully transmits light of a first state of linear polarization, and reflects light of a second state of linear polarization. In the representative embodiment, the second PBS 609 transmits P-polarized light and reflects S-polarized light.

The third optical component 603 also comprises second long wavelength pass (LWP) S-polarization filter 610. The second LWP S-polarization filter 610 is substantially the same as the first LWP S-polarization filter 607, and is highly efficient at separating light having first wavelength $\lambda_1$ and light having second wavelength $\lambda_2$, which may be comparatively closely spaced wavelengths (e.g., 1550 nm and 1565 nm). Like the first LWP S-polarization filter 607, the second LWP S-polarization filter 610 has a total physical thickness of approximately 13 μm, which is approximately one-half the thickness of the known non-polarizing edge filter.

In operation, the first optical component receives an input optical beam 611. The input optical beam 611 comprises light having the first wavelength $\lambda_1$ and light having the second wavelength $\lambda_2$, where the first wavelength is greater than the second wavelength. The input optical beam 611 also comprises light having the tracer wavelength. The input optical beam 611 is reflected by the first optical component up to the tracer LWP 604 and emerges as tracer optical beam 612. The input optical beam 611 also comprises light having the tracer wavelength. The tracer LWP 604 reflects the tracer light, which has a comparatively short wavelength, and transmits the light having first wavelength $\lambda_1$ and light having second wavelength $\lambda_2$, which emerges as first optical beam 613.

The first optical beam 613 is incident on the first PBS 605, which reflects second light beam 614, which is S-polarized light, and transmits third light beam 615, which is P-polarized light. Notably, the first PBS 605 is configured to transmit substantially all of the light of the first and second wavelengths having a first state of polarization, and to reflect substantially all of the light of the first and second wavelengths having a second state of polarization. As such, the second light beam 614 and the third light beam 615 each comprise light of the first and second wavelengths.

The third light beam 615 is incident on the first half-wavelength optical phase retarder 606, and emerges as S-polarized light. The third light beam 615 travels into the second optical component 602 and is incident on the first LWP S-polarization filter 607. As noted above, the first wavelength ($\lambda_1$) is greater than the second wavelength ($\lambda_2$). As such, the first LWP S-polarization filter 607 transmits the S-polarized fourth optical beam 616 and reflects fifth optical beam 617. The S-polarized fourth optical beam 616 comprises light of the first wavelength ($\lambda_1$), which is substantially S-polarized light. The fifth optical beam 617 comprises light of the second wavelength ($\lambda_2$), which is S-polarized light.

The fourth optical beam 616 is reflected from the second optical component and traverses into the third optical component 603. The fourth optical beam 616 is incident on the second half-wavelength phase retarder 608 and is transmitted therethrough. As such, the fourth optical beam 616 provides a portion of a first output optical beam 618, where this portion comprises P-polarized light having the first wavelength ($\lambda_1$).

The fifth optical beam 617 is incident on the second half-wavelength optical phase retarder 608, and emerges as light of the second wavelength ($\lambda_2$), which is also P-polarized light. The fifth optical beam 617 is incident on the second LWP S-polarization optical filter 610. The fifth optical beam 617 is transmitted by the second LWP S-polarization optical filter 610 and emerges as a portion of the second output optical beam 620, where this portion comprises P-polarized light having the second wavelength ($\lambda_2$).

Sixth optical beam 619 is reflected at the first PBS 605, and enters the third optical component where it is reflected and is incident on the second LWP S-polarization optical filter 610. Sixth optical beam 619 is substantially S-polarized light comprising light of the first and second wavelengths. As such, light with the first wavelength ($\lambda_1$) is transmitted by the second LWP S-polarization filter 610 and is incident on the second PBS 609. Sixth optical beam 619 is reflected at the second PBS 609 and provides a portion of the first output optical beam 618, where this portion comprises S-polarized light having the first wavelength ($\lambda_1$). Light with the second wavelength ($\lambda_2$) of the sixth optical beam is reflected by the second LWP S-polarization filter 610 and provides a portion of the second output optical beam 620, where this portion comprises S-polarized light.

As such, first output optical beam 618 comprises light of the first wavelength ($\lambda_1$), and comprises S-polarized light and P-polarized light; and the second output optical beam 620 comprises light of the second wavelength ($\lambda_2$), and comprises S-polarized light and P-polarized light.

Figure 7:
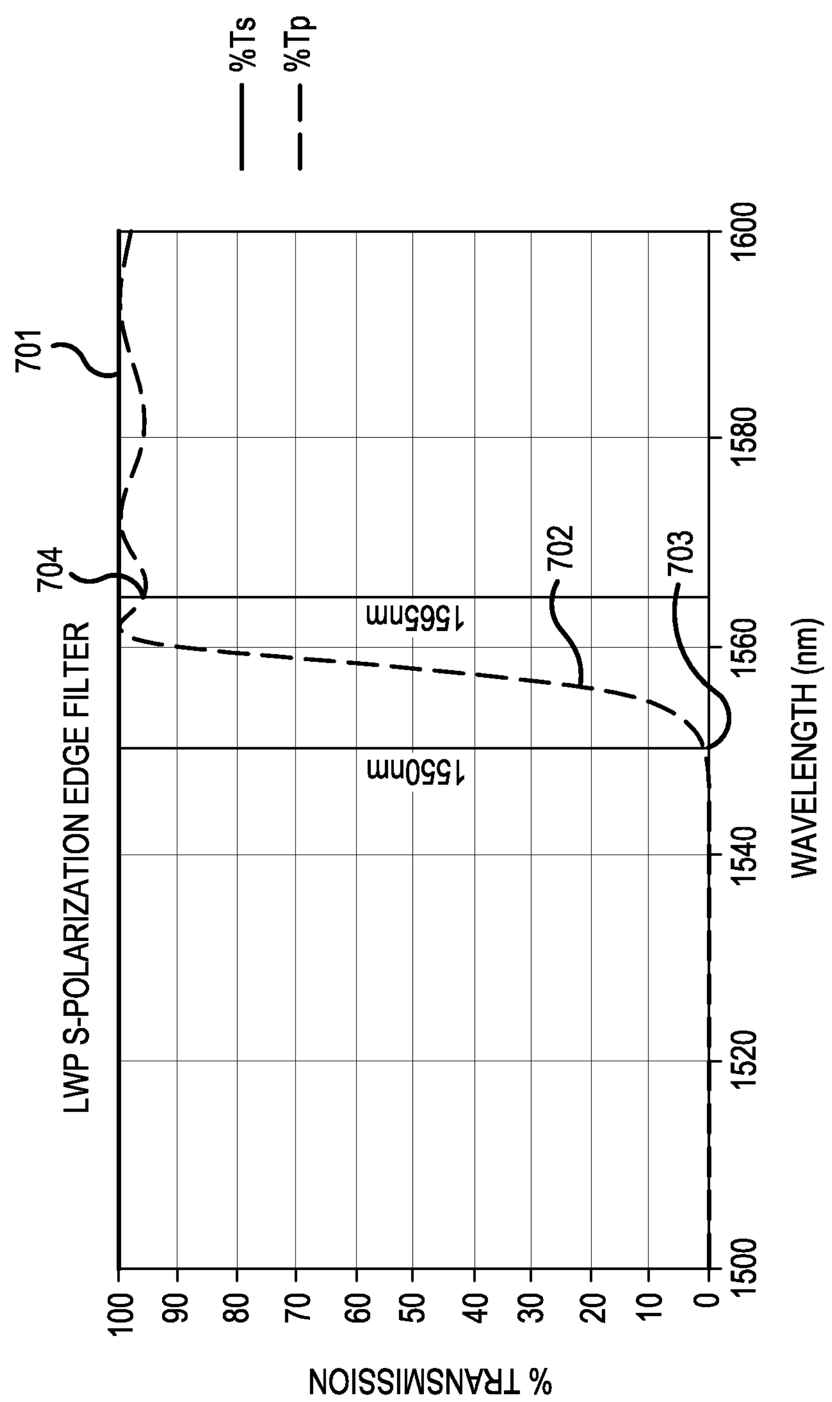
FIG. 7 is a graph of transmittance (%) versus wavelength of an optical filter according to a representative embodiment.

FIG. 7 is a graph of transmittance (%) versus wavelength of first and second LWP S-polarization filters 607,610 according to a representative embodiment. Notably, curve 701 depicts the transmittance of P-polarized light over the wavelength range depicted. Plainly, all P-polarized light is transmitted. Curve 702 depicts the transmittance of S-polarized light over the wavelength range of interest. As shown at point 703 (second wavelength ($\lambda_2$)) the transmittance is substantially zero, whereas at point 704 (first wavelength ($\lambda_1$)) substantially all light is transmittance. At non-normal incident angle, it is significantly more efficient in terms of coating complexity to separate S-polarization of the two wavelengths. For example, to separate S for 1550 and 1565 nm, it requires about 14 μm thick LWP coating. But about 25 μm thickness LWP is needed to separate P-polarized light for 1550 and 1565 nm; and despite this, separation contrast ratio is better for S-polarized light. As such, in the presently described embodiments, S-polarized light is separated instead of P-polarized light.

One of ordinary skill in the art appreciates that many variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

What is claimed is:

1. An optical filter assembly, comprising:

a first optical assembly comprising a first face and a second face, the first face having a first non-polarizing edge filter (NPEF) disposed thereover, and the second face having a first anti-reflection (AR) coating disposed thereover; and a second optical assembly offset from the first optical assembly, the second optical assembly comprising a third face and a fourth face, the third face having a second NPEF disposed thereover, and the fourth face having a second AR coating disposed thereover, wherein an incident optical beam is incident on the first face of the first optical assembly at an angle relative to a normal to a surface of the first face sufficient to separate polarization states of the incident optical beam but not too small that physical separation of wavelengths of light is insufficient, and a reflected optical beam is reflected from the first face is incident on the third face at the angle relative to a normal to a surface of the third face sufficient to separate polarization states of the incident optical beam but not too small that physical separation of wavelengths of the light is insufficient.

2. An optical filter assembly as claimed in claim 1, further comprising a spacer disposed between the first optical assembly and the second optical assembly, the spacer comprising an opening through which the incident optical beam and the reflected optical beam pass.

3. An optical filter assembly as claimed in 1, wherein the angle is in a range of approximately 17° and approximately 30°.

4. An optical filter assembly as claimed in claim 1, wherein the incident optical beam comprises a first wavelength and a second wavelength, and the first wavelength is greater than the second wavelength.

5. An optical filter assembly as claimed in claim 4, wherein the incident optical beam has the first wavelength and is transmitted through the second face of the first optical assembly.

6. An optical filter assembly as claimed in claim 4, wherein the reflected optical beam has the second wavelength.

7. An optical filter assembly as claimed in claim 6, wherein the reflected optical beam is reflected from the third face.

8. An optical filter assembly, comprising:

a first optical component adapted to receive an input optical beam, the input optical beam comprising light having a first wavelength and a second wavelength, wherein the first wavelength is greater than the second wavelength;

a first polarization beam splitter (PBS) disposed in the first optical component, the first PBS configured to transmit substantially all of the light of the first and second wavelengths having a first state of polarization, and to reflect substantially all of the light of the first and second wavelengths having a second state of polarization;

a first half-wave optical phase retarder disposed over a surface of the first optical component, wherein the transmitted light of the first and second wavelengths having a first state of polarization is incident on the first half-wave optical phase retarder and emerges from the first half-wave optical phase retarder having the second state of polarization;

a second optical component adapted to receive the light of the first and second wavelengths having the second state of polarization reflected by the first PBS, the second optical component comprising a first long-wavelength pass (LWP) optical filter that transmits the light of the first wavelength and having the second state of polarization reflected from the first PBS, and that reflects the light of the second wavelength and having the second state of polarization reflected from the first PBS;

a second half-wave optical phase retarder disposed over a surface of the second optical component, wherein the transmitted light of the first and second wavelengths having a first state of polarization is incident on the second half-wave optical phase retarder and emerges from the second half-wave optical phase retarder having the second state of polarization;

a third optical component adapted to receive the light of the first wavelength and the second wavelength and having the second state of polarization transmitted by the first PBS, the third optical component comprising a second LWP optical filter, wherein the second LWP transmits the light of the first wavelength and having the second state of polarization transmitted by the first PBS, and that reflects the light of the second wavelength and having the second state of polarization transmitted by the first PBS, the light reflected by the second LWP being incident on a second half-wave optical phase retarder and emerges from the second half-wave optical phase retarder having the first state of polarization being transmitted to the second optical component and transmitted by the first LWP; and a second PBS disposed in the second optical component, wherein the light of the first wavelength and having the second state of polarization transmitted by the first PBS is incident on a second half-wave plate and emerges from the half-wave plate having the first state of polarization and is transmitted by the second PBS, and the light of the second wavelength and having the second state of polarization that is transmitted by the first LWP is reflected by the second PBS.

9. An optical filter assembly as claimed in claim 8, wherein each of the first and second LWP optical filters are adapted to pass the light having the first wavelength and the first polarization state, and to pass the light having the second polarization state at both the first and second wavelengths.

10. An optical filter assembly as claimed in claim 8, wherein the first and second LWP optical filters each comprise a thin film interferometer configured to transmit light of the first wavelength.

11. An optical filter assembly as claimed in claim 8, further comprising a third LWP filter disposed in the first optical component and adapted to transmit a optical beam comprising a tracer wavelength.

12. An optical filter assembly as claimed in claim 8, wherein the half-wave optical phase retarder comprises a birefringent material.

13. An optical filter assembly, comprising:

a first optical assembly comprising a first face and a second face, the first face having a first non-polarizing edge filter (NPEF) disposed thereover, and the second face having a first anti-reflection (AR) coating disposed thereover;

a second optical assembly offset from the first optical assembly, the second optical assembly comprising a third face and a fourth face, the third face having a second NPEF disposed thereover and a second AR coating disposed thereover, wherein an incident optical beam is incident on the first face of the first optical assembly at an angle relative to a normal to a surface of the first face sufficient to separate polarization states of the incident optical beam but not too small that physical separation of wavelengths of light is insufficient, and a reflected optical beam is reflected from the first face is incident on the third face at the angle relative to a normal to a surface of the third face sufficient to separate polarization states of the incident optical beam but not too small that physical separation of wavelengths of the light is insufficient; and a layer disposed between the first face and the third face, the layer comprising a material having a same index of refraction as a material of the first optical assembly and the second optical assembly, wherein the first NPEF and the second NPEF each have a thickness that is approximately one half the thickness of the first NPEF and the second NPEF of an optical filter assembly not comprising the layer.

* * * * *